(12) United States Patent
Kwatra et al.

(10) Patent No.: US 11,630,865 B2
(45) Date of Patent: Apr. 18, 2023

(54) USER REACTION BASED INFORMATION OPTIONS

(71) Applicant: INTERNATIONAL BUSINESS MACHINES CORPORATION, Armonk, NY (US)

(72) Inventors: Shikhar Kwatra, San Jose, CA (US); Raghuveer Prasad Nagar, Kota (IN); Jeremy R. Fox, Georgetown, TX (US); Melissa Restrepo Conde, Leland, NC (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/100,991

(22) Filed: Nov. 23, 2020

(65) Prior Publication Data
US 2022/0164392 A1    May 26, 2022

(51) Int. Cl.
*G06F 16/9032*   (2019.01)
*G06F 16/9535*   (2019.01)
*G06F 3/01*      (2006.01)
*G06F 16/957*    (2019.01)

(52) U.S. Cl.
CPC ........ *G06F 16/90324* (2019.01); *G06F 3/013* (2013.01); *G06F 16/957* (2019.01); *G06F 16/9535* (2019.01)

(58) Field of Classification Search
CPC ............. G06F 16/90324; G06F 16/957; G06F 16/9535; G06F 3/03
USPC ........................................................ 707/723
See application file for complete search history.

(56) References Cited

U.S. PATENT DOCUMENTS

| | | | |
|---|---|---|---|
| 10,089,896 B2 | 10/2018 | Chetlur | |
| 10,171,877 B1 | 1/2019 | Shah | |
| 10,306,311 B1 | 5/2019 | Knas | |
| 10,360,254 B1 | 7/2019 | Knas | |

(Continued)

OTHER PUBLICATIONS

Medhat, et al., "Sentiment Analysis Algorithms and Applications: A Survey," Ain Shams Engineering Journal, vol. 5, Issue 4, https://reader.elsevier.com/reader/sd/pii/S2090447914000550?token, Dec. 2014, pp. 1093-1113.

(Continued)

*Primary Examiner* — Kuen S Lu
(74) *Attorney, Agent, or Firm* — Kristofer L. Haggerty

(57) ABSTRACT

A method, a computer program product, and a computer system determine, based on reactions exhibited by a user while consuming information, options for further information. The method includes determining a user reaction while the user is consuming the information. The user reaction is indicative of the user implicitly requesting the further information. The information is presented based on the user selecting from original search results according to an original search string submitted by the user. The method includes determining a portion of the information corresponding to the user reaction being exhibited. The method includes determining a further search string corresponding to the portion of the information. The method includes receiving further search results based on the further search string. Each of the further search results configured to present the further information to the user. The method includes modifying the original search results to include the further search results.

20 Claims, 5 Drawing Sheets

(56) References Cited

U.S. PATENT DOCUMENTS

| | | |
|---|---|---|
| 2008/0147821 A1 | 6/2008 | Dietrich |
| 2010/0318551 A1* | 12/2010 | Lai ..................... G06F 16/9535 |
| | | 707/765 |
| 2014/0156681 A1 | 6/2014 | Lee |
| 2015/0134654 A1 | 5/2015 | Fuzell-Casey |
| 2015/0169576 A1* | 6/2015 | Panda ................ G06F 16/3326 |
| | | 707/723 |
| 2015/0302036 A1* | 10/2015 | Kumar ............... G06F 16/3325 |
| | | 707/711 |
| 2015/0347903 A1* | 12/2015 | Saxena ................ G06T 11/206 |
| | | 706/46 |
| 2019/0077009 A1* | 3/2019 | Huang .................. B25J 9/0081 |

OTHER PUBLICATIONS

Mell et al., "The NIST Definition of Cloud Computing", National Institute of Standards and Technology, Special Publication 800-145, Sep. 2011, pp. 1-7.

* cited by examiner

USER REACTION BASED INFORMATION OPTIONS

BACKGROUND

The exemplary embodiments relate generally to providing information, and more particularly to determining reactions of a user while consuming information and presenting options for further information based on the reactions.

The Internet has become a primary source of information to users. For example, a user may utilize a browser application and select a search engine to perform a search by providing an input such as a search string to receive a plurality of results that match the input. The search engine may provide the results irrespective of the attributes of the information (e.g., what the information is about, who it belongs to, where it is applicable, etc.). The information that is available on the Internet is also in multiple formats such as text, media (e.g., picture, audio, video, etc.), etc. The user then selects one or more of the different results in an attempt to ascertain the appropriate information across the formats. With the ever increasing amount of information that is available on the Internet, the user may receive results that may be too numerous with some results being irrelevant, some results being only partially relevant, some results including superfluous information, etc., the user may only consume, for example, the first few search results to try and receive the requested information. However, in instances where the user is not completely satisfied with the information that is being presented in the selected search results, the user may revisit the search string or give up the attempt to receive the requested information.

SUMMARY

The exemplary embodiments disclose a method, a computer program product, and a computer system for determining, based on reactions exhibited by a user while consuming information, options for further information. The method comprises determining a user reaction based on sensory information received while the user is consuming the information. The user reaction is indicative of the user implicitly requesting the further information. The information is presented based on the user selecting from original search results according to an original search string submitted by the user. The method comprises determining a portion of the information corresponding to the user reaction being exhibited. The method comprises determining a further search string corresponding to the portion of the information. The method comprises receiving further search results based on the further search string. Each of the further search results configured to present the further information to the user. The method comprises modifying the original search results to include the further search results.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
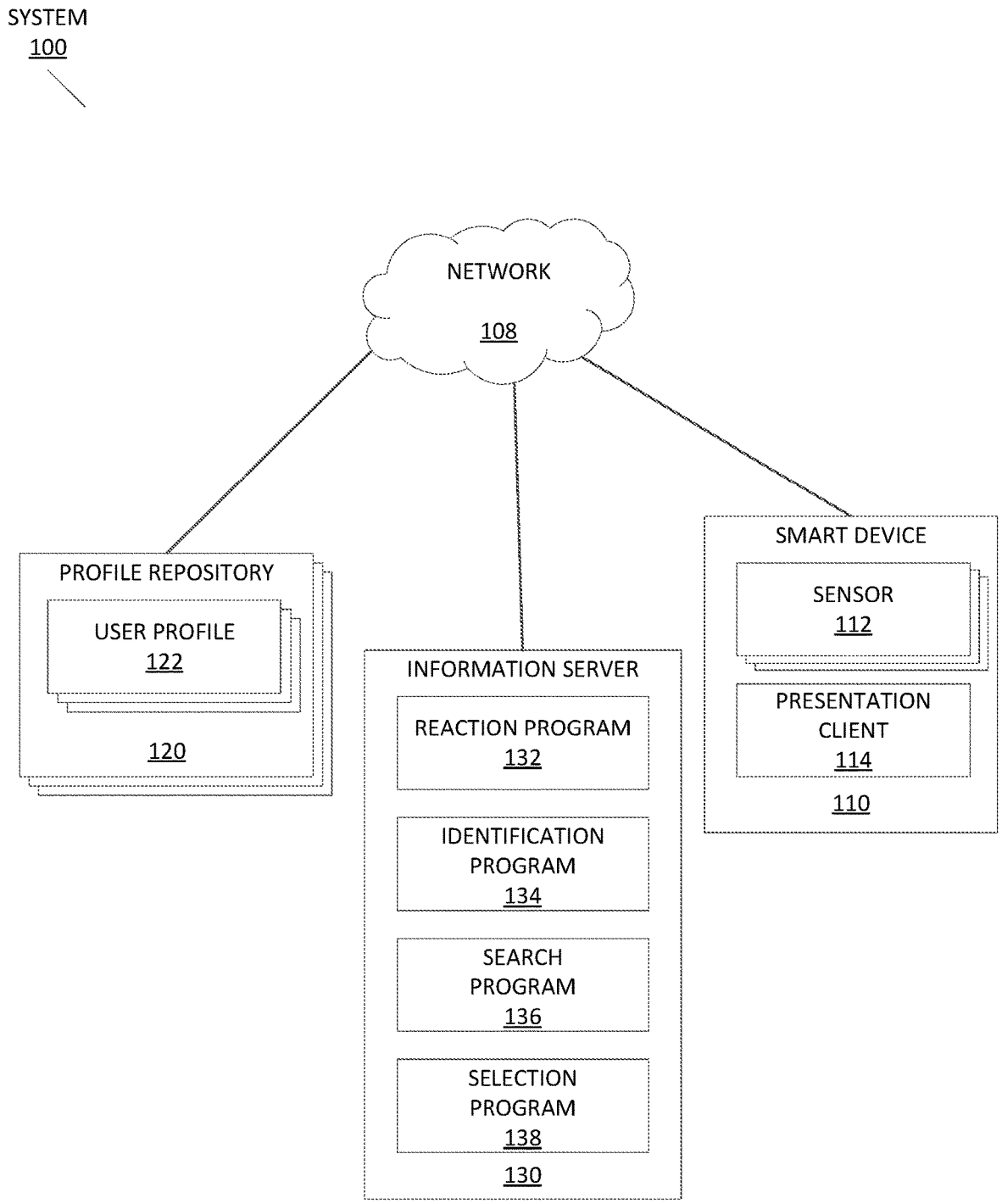
FIG. 1 depicts an exemplary schematic diagram of a information presentation system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for determining, based on reactions exhibited by a user while consuming information, options for further information. The exemplary embodiments provide a mechanism in which a user is monitored for reactions while consuming information. Based on the user reactions, the exemplary embodiments may derive additional information that the user may require or want or otherwise implicitly request such as to better understand the information being consumed. Based on the derived additional information, the exemplary embodiments may determine relevant information sources and present the determined additional information along with corresponding media and/or the sources of the additional information for the context expected out of the media. Key benefits of the exemplary embodiments may include providing an improved user experience for search based online media content consumption with an increase in overall quality of media delivery. Detailed implementation of the exemplary embodiments follows.

Utilizing current search technologies, a user may enter a search string to search for requested information. However, the user may enter a query that is under-specified such that the search engine performing the search has difficulty in discerning the user intent. As a result, the user may waste time navigating through search results without getting the requested information. Even in cases when the requested information is received, the user may find some other information that may be of interest. The user is then required to perform a further search on the new subject matter which may ultimately deviate the user's original search. Thus, the user may end up in situations where the user leaves the search engine without obtaining the objective of the requested information.

With the constantly increasing usage of information over the Internet, the information sources are increasing exponentially with corresponding growth to content generation and creation, even over a relatively small duration of time. Even for a single search context, there may be a significant number (e.g., thousands) of search results. For example, there may be a new technology that is publicly announced only few hours ago. Though it is only a single technology, a user who performs a search on this technology may receive an inordinate number of results or webpages that are available over the Internet (e.g., talking about or mentioning the technology and/or announcement) from the time that the announcement was made. Due to the impracticality of going through and consuming the information from all the search results, the user generally only selects the first few search results to know what the user wants to know (e.g., the requested information). If the user is not entirely satisfied with the information in the few viewed and/or visited sources in the search results, the user revisits the search string or gives up.

When consuming information (e.g., from selecting one of the search results), the user may receive a media file. However, while consuming this information, the user may not be clear on every piece of received information. In such cases, to understand the unclear information, the user may initiate another search session, with search terms belonging to the unclear piece of information. After understanding the unclear information, the user may return to the original media-receiving context (e.g., searched or unsearched) to completely understand it. This process creates an inconvenience to the user. In exacerbating this situation, the inconvenience may become an irritation that causes frustration or stress when the user receives multiple unclear pieces of information. In a worst case scenario, the user may simply give up and leave the original context, without completing the original intent in consuming the requested information.

Conventional approaches have provided a variety of mechanisms to improve search engine operation in providing search results to a search string or query provided by a user. For example, a conventional approach may present auxiliary information from an auxiliary information database to an audience based on a mental state of the audience during a presentation. While this conventional approach may apply to making presentations more productive, this conventional approach does not offer personalized, engaging, appealing, and/or a relevant user experience when a user receives and consumes media over an online content delivery platform nor does the conventional approach provide a dynamic update of search results. In another example, a conventional approach may adjust content where a user may have slowed or stopped consumption of content or is distracted. By tracking user metrics of the user, this conventional approach may re-engage the user. However, this conventional approach does not provide dynamic content associated with media being viewed.

The exemplary embodiments are configured to provide an improved manner for a user to consume information based on user reactions. While consuming information, the exemplary embodiments may monitor the user to determine user reactions for corresponding aspects of the information being consumed. Through this correspondence and the type of user reaction, the exemplary embodiments may determine further information that may be consumed through a dynamic updating of the search results. Accordingly, the exemplary embodiments are configured to present required or wanted information to the user without letting the user to deviate from the original context (e.g., information originally being consumed).

The exemplary embodiments are described with particular reference to consumption of media in the form of text, audio, video, etc. and search engines that provide search results. However, the exemplary embodiments may be utilized and/or modified for use with information format in which the user may receive and consume information. Additionally, the search engines and the search results are only for illustrative purposes. The exemplary embodiments may be utilized and/or modified with other manners of providing results or a selection of potential sources from which information may be consumed.

In describing the exemplary embodiments, the term "original" refers to any instance that occurs prior to a subsequent instance. Specifically, the exemplary embodiments are directed to a search string from which search results are provided. In a first instance, an original search string is used and original search results are received. In selecting one of the original search results, original information may be presented and consumed. In a second instance occurring subsequence to the first instance, a further search string is used and further search results are received. In selecting one of the further search results, further information may be presented and consumed.

FIG. 1 depicts an information presentation system 100, in accordance with the exemplary embodiments. According to the exemplary embodiments, the information presentation system 100 may include a smart device 110, one or more profile repositories 120, and an information server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the information presentation system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the information presentation system 100 that do not utilize the network 108.

In the exemplary embodiments, the smart device 110 may include one or more sensors 112 and a presentation client 114, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the primary smart device 110 is shown as a single device, in other embodiments, the primary smart device 110 may be comprised of a cluster or plurality of computing devices, in a modular manner, etc., working together or working independently. The primary smart device 110 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the one or more sensors 112 may generate various types of information associated with a user utilizing the smart device 110. The sensors 112 may generate sensory information indicative of biometrics of the user. The sensory information may be used to determine user reactions. For example, the sensors 112 may include an imager such as a camera. The imager may generate image data of the user. For example, the imager may capture features of a user's face, the user's head, the user's shoulders, the user's limbs, etc. In capturing these features, the sensors 112 may indicate or decipher a probable expression that the user may have at a given moment (e.g., while using the presentation client 114). In this manner, the imager may gather facial micro expressions for a temporal mood analysis. In another example, the sensors 112 may include eye trackers configured to determine a location on which the user's eyes are focusing. For example, the eye trackers may determine durations of focus of the user's eyes while using the presentation client 114. In capturing the focus point of the eyes and durations of that focus, the sensors 112 may indicate a location that is being viewed while other biometrics are monitored. In a further example, the sensors 112 may include biometric sensors configured to detect biometric readings of the primary user. For example, the sensors 112 may include respective biometric sensors such as a heart rate monitor configured to determine a heart rate, a thermometer configured to determine a temperature, a blood pressure monitor configured to determine a blood pressure, etc. In capturing these features, the sensors 112 may indicate or decipher a probable user reaction such as a sentiment that the user may have at a given moment (e.g., while using the presentation client 114). In this manner, the biometric sensors may monitor expressions for a temporal mood analysis indicative of a user reaction. In an additional example, the sensors 112 may include a microphone configured to determine any auditory output from the user. For example, the microphone may capture verbal or non-verbal expressions, breathing patterns, etc. In capturing auditory information, the sensors 112 may indicate or decipher a probable user reaction such as a sentiment that the user may have at a given moment (e.g., while using the presentation client 114).

In the exemplary embodiments, the presentation client 114 may act as a client in a client-server relationship and may be a software, hardware, and/or firmware based application capable of presenting information via the network 108. In embodiments, the presentation client 114 may provide a user interface in which information may be consumed by the user as well as interact with one or more components of the information presentation system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

The presentation client 114 may provide a plurality of features for the user. As noted above, the presentation client 114 may include a user interface in which data is presented to the user from which the user may interact. For example, the user may input a search string, query, etc. (hereinafter collectively referred to as "search string") into a field shown on the user interface. The user may enter the search string in an attempt to receive requested information. In a particular implementation, the presentation client 114 may be or provide functionalities substantially similar to a browser application that may connect to the Internet to retrieve information. However, in other implementations, the presentation client 114 may represent any other user application that is configured to retrieve information from a variety of sources. Upon providing the search string, the presentation client 114 may exchange data with components of the information presentation system 100 to receive search results. For example, the presentation client 114 may be in a client-server relationship with a search engine (not shown) that searches available sources from which results determined to be relevant are provided to the user. The results may be presented to the user on the presentation client 114 in various orders (e.g., based on priority, based on relevance, based on sponsorship, a combination thereof, etc.). As will be described in further detail below, the search results may also be modified using the features of the exemplary embodiments in which further search results directed toward determined further information are additionally provided to the user based on user reaction.

The presentation client 114 may include further operations that may be performed individually or as part of the above described functionality. For example, the presentation client 114 may include other information with the search string that is transmitted. The other information may be included with the search string in, for example, a header. The other information may include an identity of the user or an identity of the smart device 110 from which the search string is being transmitted. In another example, the presentation client 114 may be configured with various media display applications. The media display applications may be, for example, a video player, an audio player, a text displayer, etc. In this manner, when the user selects one of the search results that includes information in a media format, the presentation client 114 may present the information accordingly. In an alternative embodiment, the smart device 110 may include the appropriate media display applications and the presentation client 114 may be configured to call such applications when determined to be required (e.g., user manually selects a particular video player as a default player to be used in playing all videos).

In the exemplary embodiments, the profile repository 120 may include one or more user profiles 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 120 is shown as a single device, in other embodiments, the profile repository 120 may be comprised of a cluster or plurality of electronic devices, in a modular manner, etc., working together or working independently. While the profile repository 120 is also shown as a separate component, in other embodiments, the profile repository 120 may be incorporated with one or more of the other components of the information presentation system 100. For example, the profile repository 120 may be incorporated in the information server 130. Thus, access to the profile repository 120 by the information server 130 may be performed locally. In another example, the user profiles 122 represented in the profile repository 120 may be incorporated in respective ones of the smart devices 110 (e.g., the smart device 110 has a profile repository 120 including at least the user profile 122 of the user who is associated therewith). Thus, access to the profile repository 120 and to a specific one of the user profiles 122 may be performed through a transmission from the smart device 110. The profile repository 120 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the user profiles 122 may each be associated with a respective user and may be populated with various types of information that may be used for subsequent operations used in determining and providing further information to the user. In an exemplary embodiment, the user profiles 122 may each be associated with a user identification to uniquely identify the user. In another exemplary embodiment, each of the user profiles 122 may include a reaction profile for the users. The reaction profile may indicate how various reactions exhibited by the user corresponds to consumption of information. As each user may exhibit a different reaction to a common stimulus, the reaction profile included in the user profile 122 may provide an interpretation of what is expressed by the reaction. For example, a first user may show stress or frustration when encountering new information (e.g., a new word or acronym) that is unknown and which may require further research. In contrast, a second user may laugh sarcastically when encountering new information. In this manner, the reaction profile may include various reactions and corresponding meanings to those reactions respective to the user. The reaction profile included in the user profile 122 may be populated utilizing various mechanisms. For example, in monitoring the sensory information measured by the sensors 112, the information presentation system 100 (e.g., via an operation performed by the information server 130) may perform post-processing operations to confirm or validate reactions and meanings of those reactions. Accordingly, the information presentation system 100 may update and maintain the user profiles 122 including the reaction profile. In another example, the information presentation system 100 may receive information from a further component that is configured to determine the various correlations between reactions and meanings of those reactions. Accordingly, the information presentation system 100 may receive the reaction profile to be included in the user profile 122 for the user. The reaction profile included in the user profile 122 may also include indications on how to determine the user reaction based on the sensory information. In a substantially similar manner as to personalized reactions for a given situation, the users of the smart devices 110 may have personalized sensory information for a given user reaction. Accordingly, the reaction profile may further include this information.

In the exemplary embodiments, the information server 130 may include a reaction program 132, an identification program 134, a search program 136, and a selection program 138, and act as a server in a client-server relationship with the presentation client 114 as well as be in a communicative relationship with the profile repository 120. The information server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the information server 130 is shown as a single device, in other embodiments, the information server 130 may be comprised of a cluster or plurality of computing devices, working together or working independently. While the information server 130 is also shown as a separate component, in other embodiments, the operations and features of the information server 130 may be incorporated with one or more of the other components of the information presentation system 100. For example, the operations and features of the information server 130 may be incorporated in the smart device 110. The information server 130 is described in greater detail as a hardware implementation with reference to FIG. 3, as part of a cloud implementation with reference to FIG. 4, and/or as utilizing functional abstraction layers for processing with reference to FIG. 5.

In the exemplary embodiments, the reaction program 132 may be a software, hardware, and/or firmware application configured to determine a user reaction. The reaction program 132 may receive sensory information as measured by the sensors 112 while the user is consuming information. For example, the user may have submitted a search string for which a selected search engine returns search results for the search string. The search results may be based on a plurality of different factors that the search engine may use. Those skilled in the art will understand the various ways in which a search engine may prioritize search results that are to be returned for a query. The user may select one of the search results which may redirect the user to the source of the selected search result (e.g., a webpage, a media file, etc.). The user may begin to consume the information corresponding to the selected search result. While consuming this information, the sensors 112 may monitor the user and generate respective sensory information which is provided to the reaction program 132. The reaction program 132 may determine the types of reactions being exhibited by the user.

In the exemplary embodiments, the identification program 134 may be a software, hardware, and/or firmware application configured to process the determined reaction as indicated by the reaction program 132. The identification program 134 may determine a meaning of the user reaction based on the reaction profile included in the user profile 122. For example, the user profile 122 may include historical instances of user reactions and corresponding meanings (e.g., confusion, understanding, etc.). Based on the user reaction that has been determined, the identification program 134 may correlate the determined user reaction to its meaning that is specific to the user.

The identification program 134 may also receive the sensory information to identify a portion of the information being consumed that corresponds to the user reaction being exhibited. For example, in a text media format, the user may react in a particular way while reading a particular portion of the information being presented (e.g., frowning that is indicative of the user not completely understanding what is being read). The sensors 112 may include eye trackers that may identify the particular portion of the information. The identification program 134 may then determine keywords or other indicative aspects that may indicate a topic or information used to generate a further search string (e.g., via natural language processing (NPL)). In another example, in an audio media format, the user may react in a particular way while hearing a particular portion of the information being presented. The identification program 134 may determine a timeframe that the reaction is exhibited and extrapolate the portion of the information based on the timeframe. The identification program 134 may identify the words and/or sounds that are played out to generate a further search string. In a further example, in a video media format, the user may react in a particular way while viewing and/or hearing a particular portion of the information being presented. As video includes both a visual and auditory component, the identification program 134 may utilize the above mechanisms for text and audio and apply these mechanisms for video. Furthermore, as the user may be viewing a portion of the video that is irrelevant to the audio or vice versa, the identification program 134 may filter the sensory information to determine the portion of the information that caused the user reaction to be exhibited.

In the exemplary embodiments, the search program 136 may be a software, hardware, and/or firmware application configured to search for further information based on identified portion of information. The search program 136 may perform a background operation in which the identified portion of information is searched in a further search string. The search program 136 may formulate the search string based on the identified portion of information as indicated by the identification program 134. For example, the search program 136 may submit a further search string to the search engine. The search program 136 may receive further search results in response to the further search string.

In the exemplary embodiments, the selection program 138 may be a software, hardware, and/or firmware application configured to provide further information to the user. Based on the further search results, the selection program 138 may select a predetermined number of the results. For example, if the search engine that is selected utilizes a relevance threshold to prioritize search results, the selection program 138 may select the predetermined number of results in the order that the further search results are provided. In another example, the search engine and/or the selection program 138 may be preconfigured to prioritize results based on other factors (e.g., sponsorships) such that these results are given priority over other results. The selection program 138 may identify search results that match this criterion and select the predetermined number of the results. The predetermined number may be defined by, for example, an administrator, a user preference, etc.

Based on the selected further search results from the further search string corresponding to the portion of the information for which the user reaction is exhibited, the selection program 138 may update the original search results (e.g., based on the search string submitted by the user) to incorporate the selected further search results. The selection program 138 may incorporate the selected further search results in a variety of manners. For example, the selection program 138 may append the search results with the selected further search results. The appending may be after the search result selected by the user from the original search results, at the end of the original search results, etc. In another example, the selection program 138 may place the further search results in a way as to provide context to the user for including the further search results in the original search results. In a particular implementation, the further search results may be shown such as with a sub-heading or indentation after the selected search result from the original search results (e.g., if the user selected the second search result in the original ten search results, the further search results may be placed indented between the second and third search results of the original search results).

The information server 130 may utilize the programs 132-138 to incorporate further features. For example, the information server 130 may be configured to incorporate social media engagement and collaboration. In optimizing the content delivery of information that is dynamically presented to the user in real time, the information server may use an ability to integrate the social collaboration priorities associated with the user (e.g., likes, dislikes, hobbies, interests, communities, etc.) queried from social media outlets or sites. In this manner, the information server 130 may prioritize the content display, overlay, or replacement thereof back to the user's content display.

In another example, the reaction program 132 of the information server 130 may be configured to determine the user's current state of mind. For example, the sensory information measured by the sensors 112 may also be used to determine the user's state of mind while the user reaction is exhibited or an overall user's state of mind. Based on the user's state of mind, the information server 130 may dynamically adjust to using a further search string to present further information that may be more appealing to the user. For example, crowdsourced data may be leveraged to determine a ranking of content that may be most suitable for specific moods (e.g., user specific content that should be presented if the user is showing gestures or other indications of a state of mind exhibiting boredom, confusion, anger, etc.).

Figure 2:
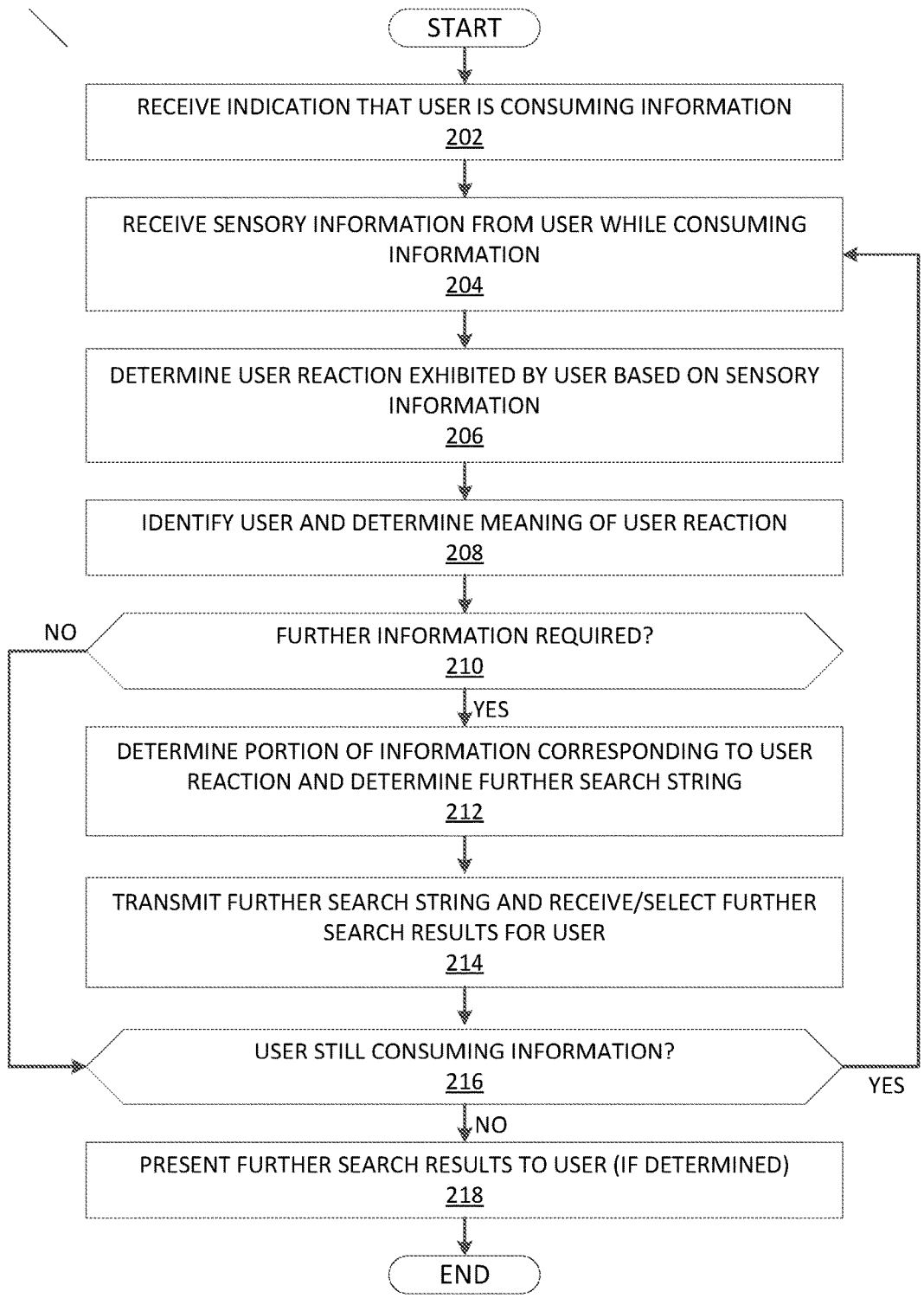
FIG. 2 depicts an exemplary flowchart of a method illustrating the operations of a information server 130 of the information presentation system 100 in determining, based on reactions exhibited by a user while consuming information, options for further information, in accordance with the exemplary embodiments.

FIG. 2 depicts an exemplary flowchart of a method 200 illustrating the operations of the information server 130 of the information presentation system 100 in determining, based on reactions exhibited by a user while consuming information, options for further information, in accordance with the exemplary embodiments. The method 200 may relate to operations that are performed by the reaction program 132, the identification program 134, the search program 136, and the selection program 138 to determine the options for the further information. The method 200 will be described from the perspective of the information server 130.

The information server 130 receives an indication that the user is consuming information (step 202). In utilizing the features of the exemplary embodiments, the user may have initiated an information consumption session in which a search is performed to receive requested information. The user may have submitted a search string, from which a search engine may return a set of search results. For illustrative purposes, the search results that are returned for the search string submitted by the user is referred to as original search results. The user may select one of the original search results to receive corresponding information. The user may begin to consume this information. As the user interacts with the search engine, the information server 130 may receive the various signals being exchanged from the smart device 110 with the network 108. Accordingly, when information is requested and received, the information server 130 may determine when the user is consuming information.

The information server 130 receives sensory information from the user while consuming the information (step 204). The smart device 110 may be equipped with the sensors 112 that measure sensory information about the user. The sensory information may relate to any biometric about the user (e.g., visual focus through eye tracking, micro-expression determination, audio cues, etc.). Using the sensory information, the information server 130 determines a user reaction exhibited by the user (step 206). The information server 130 may determine the user reaction, state of mind, cognitive state, etc. using any manner of determining such a conclusion as one skilled in the art will reasonably understand.

The information server 130 identifies the user and determines a meaning of the determined user reaction (step 208). Initially, as described above, in a particular implementation, the user profile 122 may include a reaction profile that includes how to interpret sensory information for a given user to determine the corresponding user reaction. The correlation between user reaction and sensory information for the given user may be based on, for example, historical determinations. Thus, upon identifying the user, the information server 130 may utilize the user profile 122 to determine the user reaction or validate the user reaction determined based on a standard process (e.g., a non-personalized approach).

Also described above, the reaction profile included in the user profile 122 may include a correlation between user reactions and a meaning of the user reaction specific to the user associated with the user profile 122. For example, the information server 130 and/or a further component may have made historical determinations of correlations that indicate what is meant by a particular user reaction. Specifically, the information server 130 may determine when a user exhibits a user reaction that indicates a need for further information (e.g., a first user may react with confusion, a second user may react with frustration, etc.). The user profile 122 may include an indication corresponding to each type of user reaction as to whether that user reaction is indicative of the user requiring or wanting the further information. That is, the user reaction may be indicative of the user implicitly requesting the further information. The indication may be set in a variety of manners (e.g., as a yes/no value, as a range of values with a threshold value separating whether the user reaction positively or negatively indicates further information being required, etc.).

The information server 130 may determine whether further information is required based on the user reaction of the user consuming the information (decision 210). As noted above, for a specific user, as indicated in the user profile 122 for that user, the user reaction may correspond to a type for which the user requires the further information. As a result of the user reaction being any other type for which the user does not require the further information (decision 210, "NO" branch), the information server 130 determines whether the user is still consuming the information from the selection of the original search results (decision 216). As a result of the user continuing to consume the information (decision 216, "YES" branch), the information server 130 continues to monitor the user in case further information is required. As a result of the user concluding the consumption of the information (decision 216, "NO" branch), if no further information has been determined to be required, the information server 130 may conclude the process for this consumption session. The information server 130 may also perform post-processing operations such as providing updates to the reaction profile included in the user profile 122 or provide the results of the consumption session to the component that updates the user profile 122 such that the user profile 122.

As a result of the user reaction being indicative of the user requiring the further information (decision 210, "YES" branch), the information server 130 determines a portion of the information being consumed that corresponds to when the user reaction was exhibited and determine a further search string based on the portion of the information (step 212). For example, the sensors 112 may include eye trackers that determine a focus area in the information that the user is viewing when the user reaction is exhibited. Thus, for information presented in text media or video media, the information server 130 may determine the portion of the information that is being consumed which corresponds to the user reaction. Based on the portion of the information, the information server 130 may utilize various analyzing techniques (e.g., NPL) to determine one or more topics that the portion of information may be directed. The information server 130 may utilize this analysis to generate a further search string.

The information server 130 transmits the further search string such that the information server 130 receives and selects further search results for the user so the user may consume the further information (step 214). The information server 130 may transmit the further search string as an automatic operation (e.g., without user intervention or knowledge) to a search engine. The search engine may be the same search engine used with the search string to receive the original search results or may be a different search engine. Based on the further search string, the information server 130 may receive a plurality of further search results. To prevent inundating the user with excessive information options, the information server 130 may be configured with a predetermined number of the further search results to select. The information server 130 may therefore select only up to the predetermined number from the further search results based on a factor in presenting the further information (e.g., highest relevance further search results are selected, sponsored further search results are selected, a combination thereof, etc.).

The information server 130 determines whether the user is still consuming the information corresponding to the search string submitted by the user by selecting one of the original search results (decision 216). For example, the user may choose to continue consuming the entirety of the information before attempting to resolve issues regarding the portions of information that may be unknown or require the further information. As a result of the user continuing to consume the information (decision 216, "YES" branch), the information server 130 may continue to monitor the user (e.g., by receiving sensory information) and determine whether additional further information may be required.

As a result of the user concluding the consumption of the information for any reason (decision 216, "NO" branch), the user may return to the original search results for which the information server 130 presents the further search results to the user (step 218). The information server 130 may present the selected further search results by modifying the original search results. For example, the information server 130 may append (e.g., include the selected further search results at the end of the original search results) or dynamically incorporate (e.g., positioned after the selected one of the original search results but before the next entry in the original search results) the selected further search results. In this manner, the user may have an opportunity to consume further information through options that are presented based on how the user reacts while consuming the information.

To further illustrate the operations of the information server 130, reference is now made to an illustrative exemplary process that includes additional operations that may be incorporated. According to the illustrative exemplary process, a user may sign up or otherwise voluntarily enroll in having user reactions analyzed (e.g., user opts into an agreement for reaction tracking). The user therefore understands that the exemplary embodiments will be tracking the user reaction of the user and the sentiment analysis of the user may be conducted proactively. The exemplary embodiments may incorporate various security measures (e.g., encryption protocols) when exchanging the sensory information.

The user may search for a media resource on a smart device using, for example, a search string, a command, etc. Specifically, the user may input an original search string that is transmitted to a search engine to receive original search results. The smart device may display the list of original search results, from which the user may select one of the original search results to play a corresponding media resource. The media resource may be formatted in a variety of manners such as video, audio, image, text, etc. The exemplary embodiments may monitor the user by tracking user reactions via measuring sensory information as well as track eye movements to determine a focus area in the media resource. For example, the sensors measuring the sensory information may include a camera (e.g., from which the resulting sensory information may be used for facial recognition techniques to analyze facial reactions, for gesture analysis to observe user gestures, etc.), input devices (e.g., for user interface analytics to analyze user's reactions such as mouse movements), etc. The exemplary embodiments may detect a user reaction that depicts that the user may have come across a term or phrase which is not clear to the user. For example, user reactions on a feeling vary from user to user such that the exemplary embodiments may utilize machine learning techniques to correctly detect the user reaction. In another example, for learning purposes, multiple data sources may be used to more accurately determine the user reaction (e.g., IoT, social media, etc.).

On detecting the user reaction, the exemplary embodiments may associate the reaction to the media component. For example, a reaction detection timer may be initiated to determine a total time duration for the reaction. The computed time duration may be subtracted from the time duration for which media has been played. The exemplary embodiments may also use eye tracking data to derive the exact piece or portion of information which caused the user reaction to the frame belonging to the resulted time duration (e.g., out of subtraction). The piece of information may be a piece of text, an image, a sound or other audio, etc. The exemplary embodiments may analyze the frame and/or frame-components using various mechanisms (e.g., image recognition techniques such as CNN analysis, NLP techniques, cognitive internet search, etc.). The exemplary embodiments may search information sources (e.g., via a search engine) for the derived portion of information, where information sources may include video, audio, image, websites, etc. For example, the exemplary embodiments may use a further search string. The exemplary embodiments may receive further search results for the further search string and select the best options from among the further search results. The best options may be selected based on any criteria (e.g., number of visits, popularity, sponsored-resource, etc.) as well as based on a predetermined maximum number of options (e.g., a number "n" may be configured to select the top "n" of the further search results). When the original search results are viewed, the exemplary embodiments may update the original search results to include the computed best "n" of the further search results. In an exemplary implementation, the exemplary embodiments may determine where to insert the selected further search results (e.g., at the top/middle/bottom or at a certain sequence) based on various factors (e.g., relevance to the original context, intensity of reaction, etc.) The exemplary embodiments may continuously monitor the text being written dynamically in real time and adjust the monitoring and actions taken, if required. The exemplary embodiments may prioritize over multiple content of interest considering crowdsourced data as a "sequence of content". For example, if the user reacted as interested in three contents, the exemplary embodiments may utilize crowdsourced data to determine that a regular sequence of these three contents and display these three contents in the determined order corresponding to the regular sequence.

The exemplary embodiments may utilize various techniques in providing the further information that may be determined to be required or wanted based on the user reaction. For example, the information server 130 may incorporate ensemble learning. According to an exemplary implementation, the information server 130 may consider account environment variables as "n" results, "sequence of content", aural/visual feed, etc. using RCNN which is fed into a multi-agent reinforcement learning (MARL) algorithm. Each of the user reactions may correspond to a different set of state parameters and output variations (e.g., context displayed). In a particular example, the environment variables denoted as E may be dynamically changing over a delta duration denoted as D'. To learn a single policy denoted as 7C, the information server 130 may use all N tracks simultaneously to decide how to act at every timestep. In view of the dimensionality of the action, the information server 130 may deploy a multi-agent reinforcement learning with N agents sharing the same policy. The reward function may be awarded +1 if the user reaction shows a positive sentiment value of if a negative sentiment value is detected. Contrastly, the reward function may be awarded is awarded −1 in the opposite condition. In this manner, the state parameters including the results "n" may be refined further and x % additional information is appended further.

To further illustrate the operations of the mapping program 132, reference is now made to an illustrative exemplary embodiment. According to the illustrative exemplary embodiment, a user may be interested in learning docker best practices. The user decides to search docker best practices videos on a video media website (e.g., the user may enter a search string corresponding to docker best practices).

The search may return original search results including several tutorials around docker and provides them in a list from which the user may select. The user selects the first of the original search results and starts viewing the information. While viewing the information, the user hears about a topic regarding helm charts and becomes interested in knowing more about these helm charts. Through the features of the exemplary embodiments, the information server 130 initiates a video search (e.g., on the video media website) for helm charts and fetches further search results from which the information server 130 selects the top three results in the further search results. The information server 130 updates the original search results for the docker best practices to include the top three further search results around helm charts. The user may see these additional options for further information and select one of the selected further search results to start consuming this further information.

The exemplary embodiments are configured to provide further information to a user based on user reactions exhibited while consuming original information. In submitting an original search string to receive original search results, a selection thereof may present the original information. While consuming the original information, a user reaction may be determined that is indicative of the further information being required or wanted. The exemplary embodiments may submit a further search string corresponding to a topic that caused the user reaction to receive further search results. The further search results may be incorporated in the original search results such that the user may select from among the further search results and be presented the further information.

Figure 3:
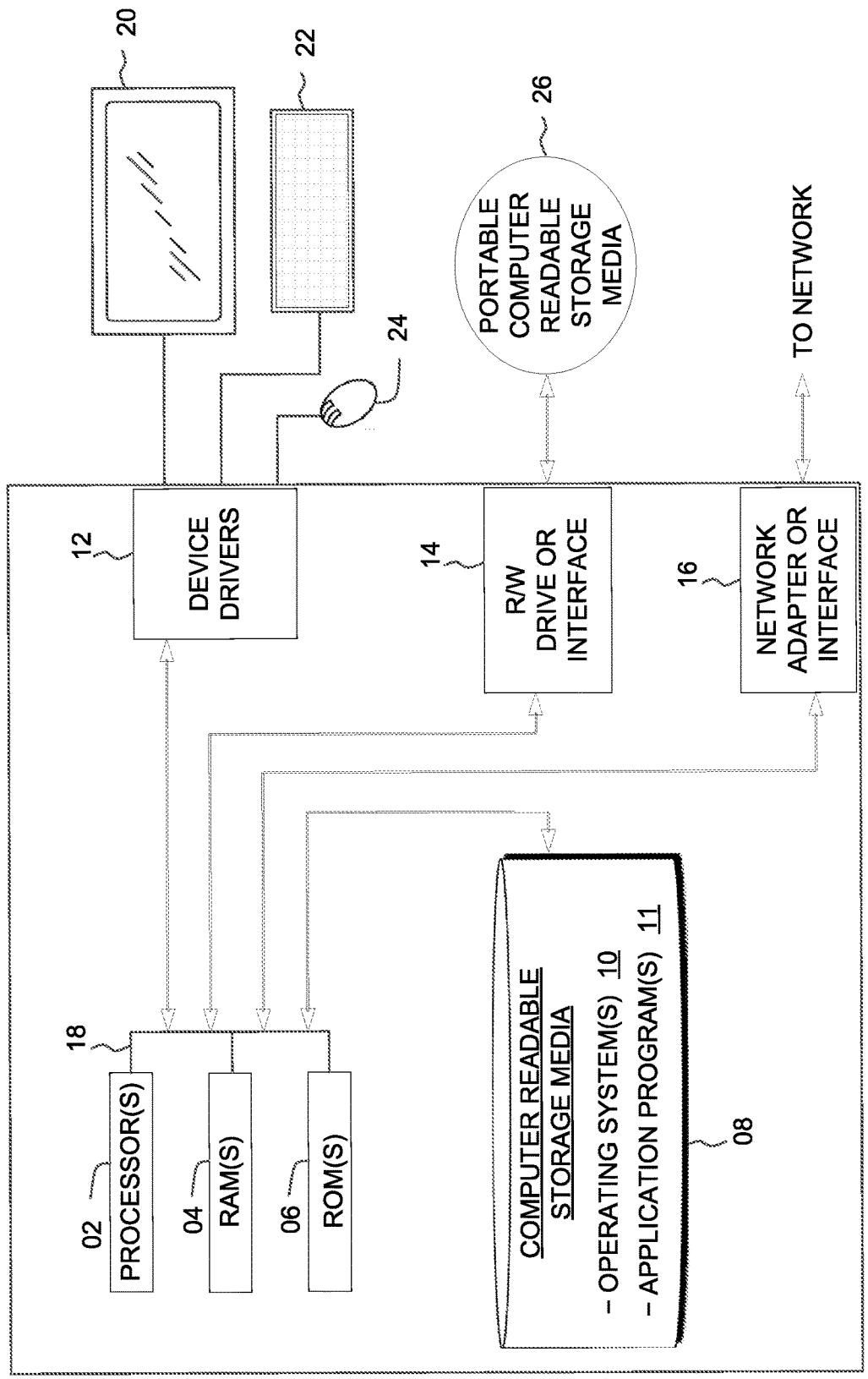
FIG. 3 depicts an exemplary block diagram depicting the hardware components of the information presentation system 100 of FIG. 1, in accordance with the exemplary embodiments.

FIG. 3 depicts a block diagram of devices within the information presentation system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a RAY drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
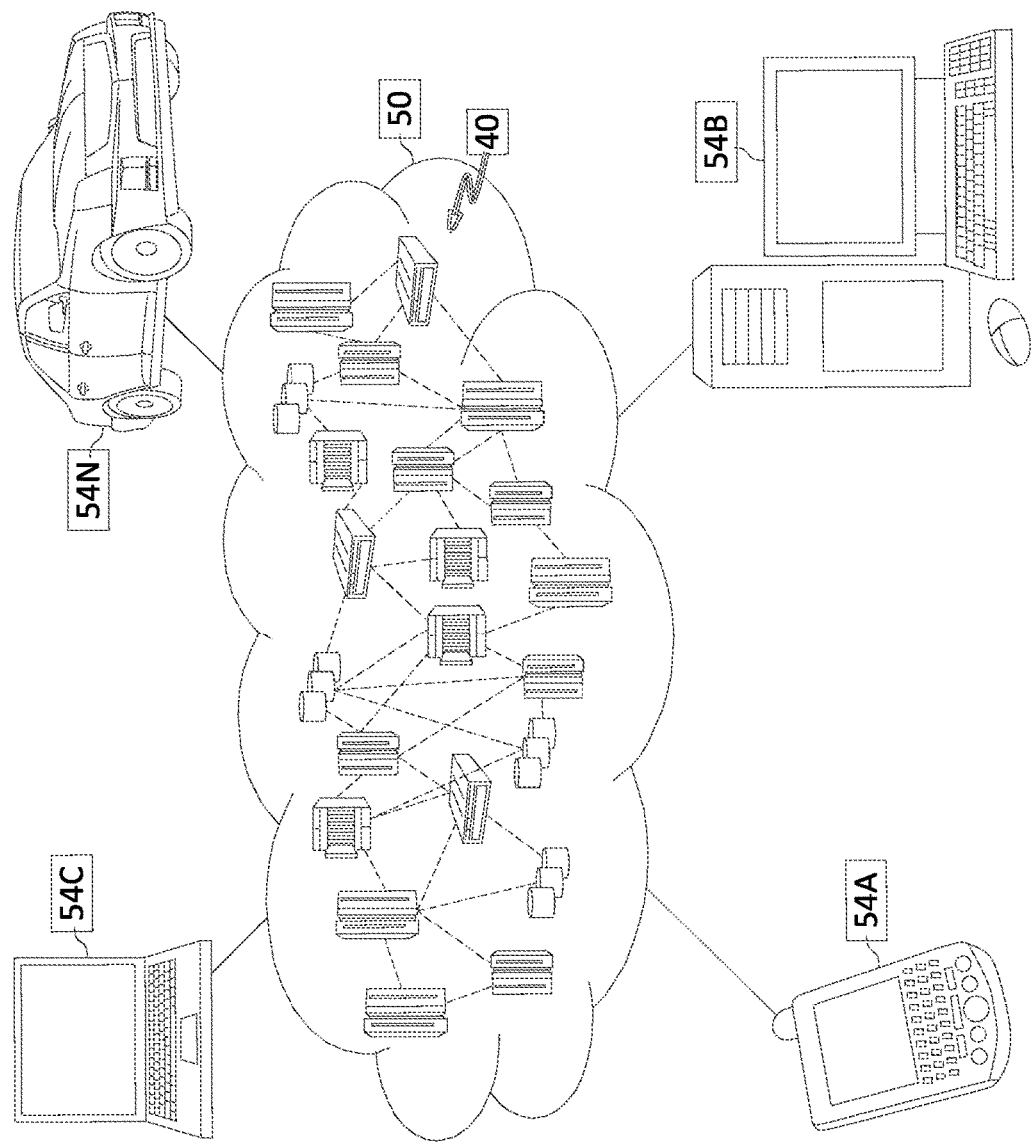
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
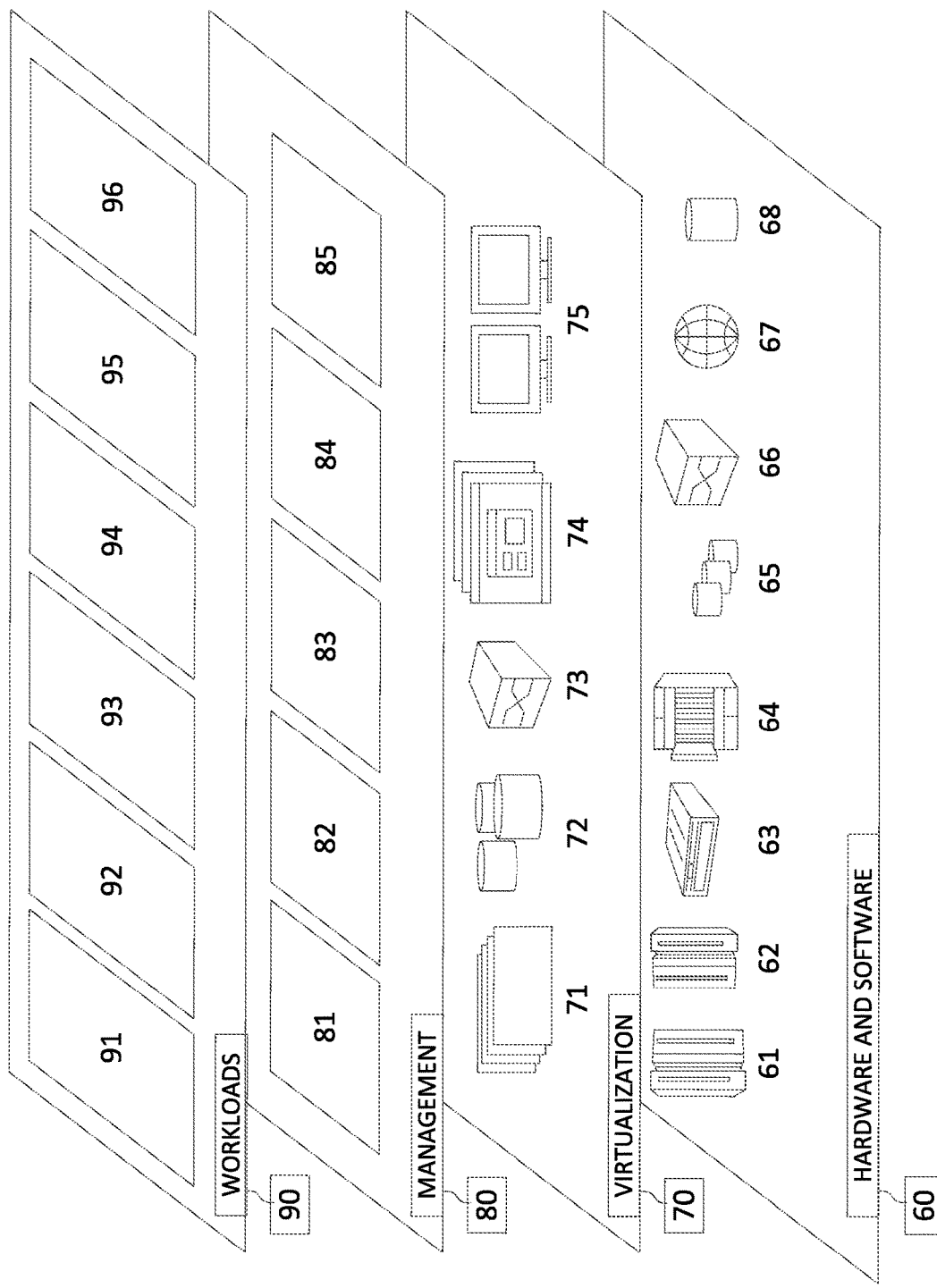
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and reaction based information processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for determining, based on reactions exhibited by a user while consuming information, options for further information, the method comprising:
   determining a user reaction based on sensory information received while the user is consuming the information, the user reaction being indicative of the user implicitly requesting the further information, the information being presented based on the user selecting a search result from original search results according to an original search string submitted by the user;
   determining a portion of the information corresponding to the user reaction being exhibited;
   determining a further search string corresponding to the portion of the information;
   receiving further search results based on the further search string, each of the further search results configured to present the further information to the user; and
   modifying the original search results to additionally include the further search results by appending the further search results after the selected search result in the original search results, the further search results being appended in a way so as to provide a context for including the further search results for the selected search result in the original search results.

2. The computer-implemented method of claim 1, wherein the sensory information includes eye tracking data, the eye tracking data being indicative of the portion of the information being focused on by the user.

3. The computer-implemented method of claim 1, further comprising:
   determining a topic corresponding to the portion of the information based on image recognition techniques, natural language processing techniques, cognitive searching techniques, or a combination thereof.

4. The computer-implemented method of claim 1, further comprising:
   receiving an identity of the user; and
   receiving a user profile corresponding to the user, the user profile including a plurality of correlations between historical user reactions and historical indications of implicit requests for historical further information.

5. The computer-implemented method of claim 1, wherein the further search results are appended by being inserted into the original search results after the selected one of the original search results with an indentation.

6. The computer-implemented method of claim 1, further comprising:
   selecting up to a predetermined number of the further search results, the original search results being modified to include the selected ones of the further search results.

7. The computer-implemented method of claim 6, wherein the selected ones of the further search results are based on relevance, sponsorship, priority, or a combination thereof.

8. A computer program product for determining, based on reactions exhibited by a user while consuming information, options for further information, the computer program product comprising:
   one or more non-transitory computer-readable storage media and program instructions stored on the one or more non-transitory computer-readable storage media capable of performing a method, the method comprising:
   determining a user reaction based on sensory information received while the user is consuming the information, the user reaction being indicative of the user implicitly requesting the further information, the information being presented based on the user selecting a search result from original search results according to an original search string submitted by the user;
   determining a portion of the information corresponding to the user reaction being exhibited;
   determining a further search string corresponding to the portion of the information;
   receiving further search results based on the further search string, each of the further search results configured to present the further information to the user; and
   modifying the original search results to additionally include the further search results by appending the further search results after the selected search result in the original search results, the further search results being appended in a way so as to provide a context for including the further search results for the selected search result in the original search results.

9. The computer program product of claim 8, wherein the sensory information includes eye tracking data, the eye tracking data being indicative of the portion of the information being focused on by the user.

10. The computer program product of claim 8, wherein the method further comprises:
    determining a topic corresponding to the portion of the information based on image recognition techniques, natural language processing techniques, cognitive searching techniques, or a combination thereof.

11. The computer program product of claim 8, wherein the method further comprises:
    receiving an identity of the user; and
    receiving a user profile corresponding to the user, the user profile including a plurality of correlations between historical user reactions and historical indications of implicit requests for historical further information.

12. The computer program product of claim 8, wherein the further search results are appended by being inserted into the original search results after the selected one of the original search results with an indentation.

13. The computer program product of claim 8, wherein the method further comprises:
    selecting up to a predetermined number of the further search results, the original search results being modified to include the selected ones of the further search results.

14. The computer program product of claim 13, wherein the selected ones of the further search results are based on relevance, sponsorship, priority, or a combination thereof.

15. A computer system for determining, based on reactions exhibited by a user while consuming information, options for further information, the computer system comprising:
    one or more computer processors, one or more computer-readable storage media, and program instructions stored on the one or more of the computer-readable storage media for execution by at least one of the one or more processors capable of performing a method, the method comprising:

determining a user reaction based on sensory information received while the user is consuming the information, the user reaction being indicative of the user implicitly requesting the further information, the information being presented based on the user selecting a search result from original search results according to an original search string submitted by the user;

determining a portion of the information corresponding to the user reaction being exhibited;

determining a further search string corresponding to the portion of the information;

receiving further search results based on the further search string, each of the further search results configured to present the further information to the user; and modifying the original search results to additionally include the further search results by appending the further search results after the selected search result in the original search results, the further search results being appended in a way so as to provide a context for including the further search results for the selected search result in the original search results.

16. The computer system of claim 15, wherein the sensory information includes eye tracking data, the eye tracking data being indicative of the portion of the information being focused on by the user.

17. The computer system of claim 15, wherein the method further comprises:

determining a topic corresponding to the portion of the information based on image recognition techniques, natural language processing techniques, cognitive searching techniques, or a combination thereof.

18. The computer system of claim 15, wherein the method further comprises:

receiving an identity of the user; and receiving a user profile corresponding to the user, the user profile including a plurality of correlations between historical user reactions and historical indications of implicit requests for historical further information.

19. The computer system of claim 15, wherein the further search results are appended by being inserted into the original search results after the selected one of the original search results with an indentation.

20. The computer system of claim 15, wherein the method further comprises:

selecting up to a predetermined number of the further search results, the original search results being modified to include the selected ones of the further search results.

* * * * *